Nov. 15, 1966 W. D. REEVES 3,284,846
POULTRY CUTTER
Filed Sept. 4, 1964 4 Sheets-Sheet 1
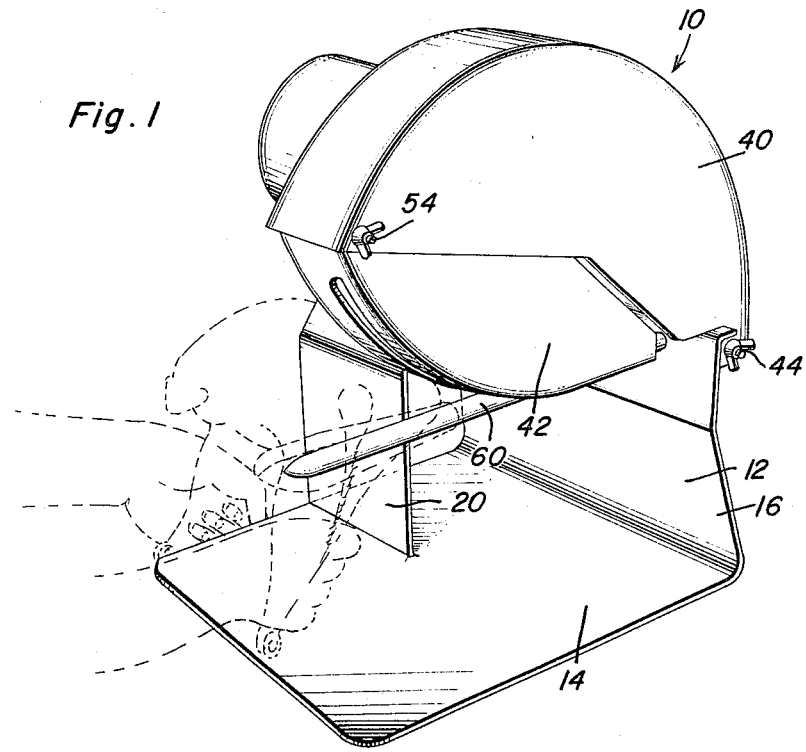
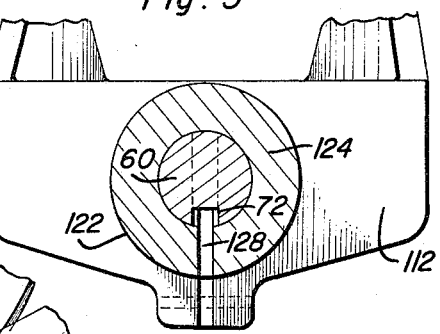
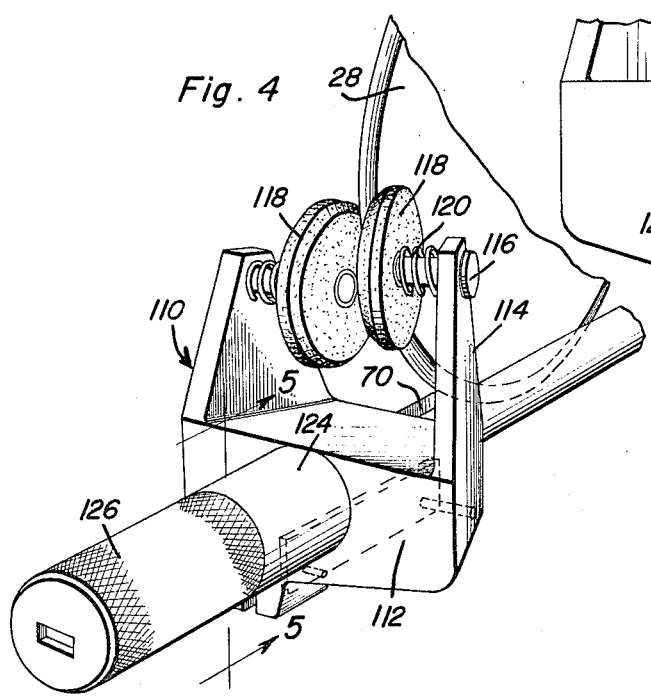
Willard D. Reeves
INVENTOR
BY *Clarence A. O'Brien*
and *Harvey B. Jacobson*
Attorneys Nov. 15, 1966 W. D. REEVES 3,284,846
POULTRY CUTTER
Filed Sept. 4, 1964 4 Sheets-Sheet 2
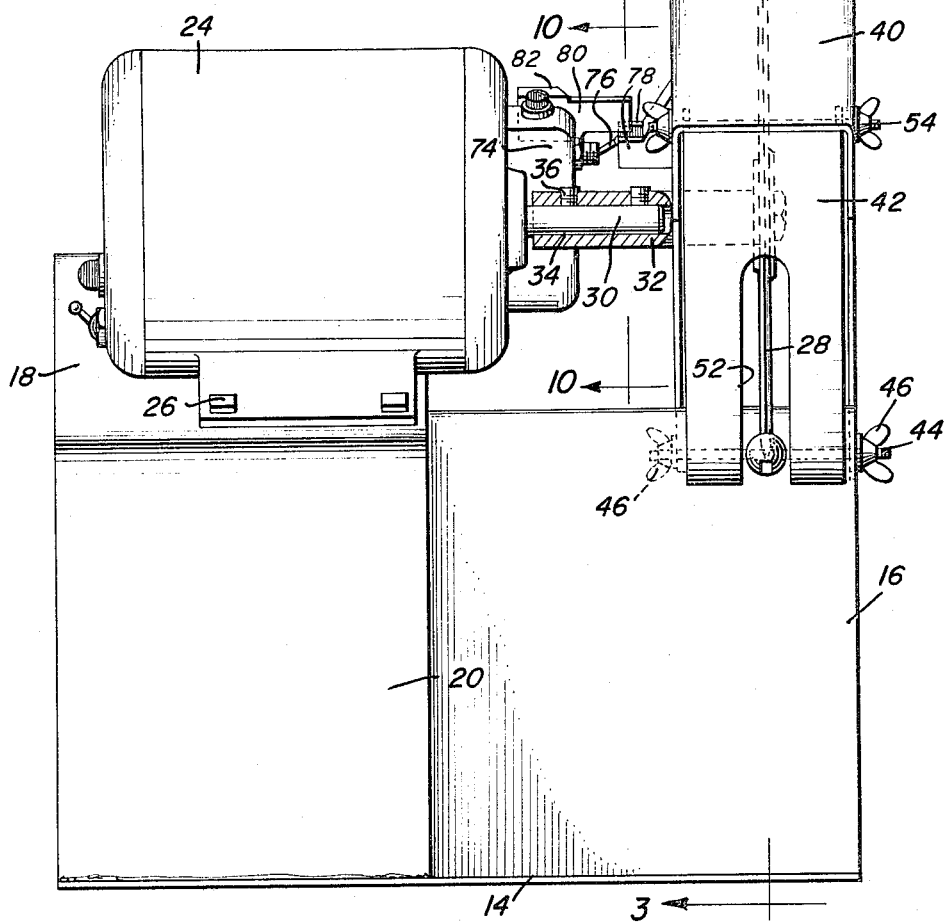
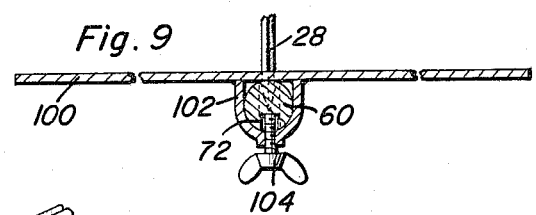
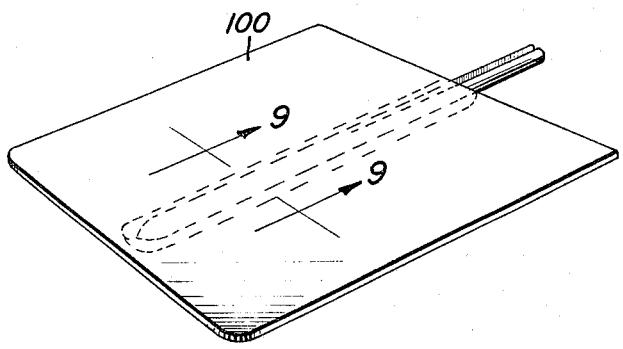
Willard D. Reeves
INVENTOR.
BY Clarence A. O'Brien
and Harvey B. Jacobson
Attorneys Nov. 15, 1966 W. D. REEVES 3,284,846
POULTRY CUTTER
Filed Sept. 4, 1964 4 Sheets-Sheet 3

Willard D. Reeves
INVENTOR.

BY *Clarence A. O'Brien*
and *Harvey B. Jacobson*
Attorneys

Nov. 15, 1966 W. D. REEVES 3,284,846
POULTRY CUTTER

Filed Sept. 4, 1964 4 Sheets-Sheet 4

Willard D. Reeves
INVENTOR.

BY Clarence A. O'Brien
and Harvey B. Jackson
Attorneys

United States Patent Office 3,284,846
Patented Nov. 15, 1966

3,284,846
POULTRY CUTTER
Willard D. Reeves, P.O. Box 1018, Center, Tex.
Filed Sept. 4, 1964, Ser. No. 394,466
5 Claims. (Cl. 17—11)

This invention comprises a novel and useful poultry cutter and more particularly pertains to an apparatus specifically adapted for the trimming and severing of poultry and other objects by means of a power operated rotary blade.

Although some of the features of this invention are applicable to various other uses in cutting, severing and trimming various objects by means of a power operated rotary knife blade, the invention is especially adapted to the trimming of poultry or other fowl.

It is the primary purpose of this invention to provide a poultry trimmer and cutter which is power operated and shall include means for supporting, precisely positioning and moving a fowl beneath and in operative engagement with the rotary knife blade to effect a complete and efficient trimming, cutting, severing of the fowl in various manners.

A further object of the invention is to provide a machine in accordance with the preceding objects which shall admit the use of various attachments for performing different specific cutting, severing and trimming operations by the rotary blade of the machine.

A further and more specific object of the invention is to provide a poultry trimmer and cutter in accordance with the preceding objects which shall include the horizontally extending support bar detachably mounted upon the machine and disposed below the power driven rotary knife blade thereof, and which support bar shall have a longitudinally extending recess in its top surface receiving the lower portion of the knife blade therein to thereby insure complete severing of the poultry moving along the support bar and beneath the knife blade.

A still further object of the invention is to provide a machine in accordance with the preceding object wherein the support bar shall be provided with a longitudinally extending keyway upon its bottom surface together with various interchangeable attachments adapted to be mounted upon and moved longitudinally of the support bar with a combined key and fastener on the attachment received in the keyway.

It is a further and more specific object of the invention to provide a device in conformity with the above-mentioned objects together with a blade sharpening attachment adapted to be mounted upon and to move slidably upon the support bar of the machine and which upon engagement with the rotating blade will effectively sharpen the edge of the latter.

Yet another object of the invention is to provide a machine with a greatly increased safety factor effected by a safety guard or shield completely enclosing the rotary blade of the machine and which when the guard is moved to a position exposing the blade will automatically disconnect the power source of the rotary blade.

A more specific object of the invention is to provide a machine in accordance with the immediately preceding object wherein a switch controlling the operation of the electric motor driving the rotary blade is provided with a control member together with an actuator carried by the safety guard and which is operatively associated with the control member to move the latter respectively to on and off positions when the safety guard is in a lowered position fully enclosing the blade and in a raised position exposing the blade respectively.

A still further object of the invention is to provide a device in accordance with the immediately preceding object including a manually operated lock releasably engaging the control member and preventing its movement from the off or safety position when the guard is in a raised position exposing the blade.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a preferred form of the invention and with the operation of the machine in trimming, severing or cutting fowls being shown in phantom therein;

FIGURE 2 is a front elevational view of the machine taken upon an enlarged scale from the left end of FIGURE 1 and with parts of the knife blade drive completely shown in section therein;

FIGURE 4 is a fragmentary perspective view of a portion of the fowl support bar and blade of the machine and showing a blade sharpener attachment mounted upon the support bar in operative position for sharpening through the rotation of the blade the cutting edge of the latter;

FIGURE 5 is a detailed view partly in section and partly in elevation of a sharpener attachment mounting, being taken substantially in vertical transverse section upon the plane indicated by the section line 5—5 of FIGURE 4;

FIGURE 8 is a perspective view of a vegetable trimming plate attachment mounted upon the support bar;

FIGURE 9 is a vertical transverse sectional view, parts being broken away, and taken substantially upon a plane indicated by section line 9—9 of FIGURE 8;

Figure 3:
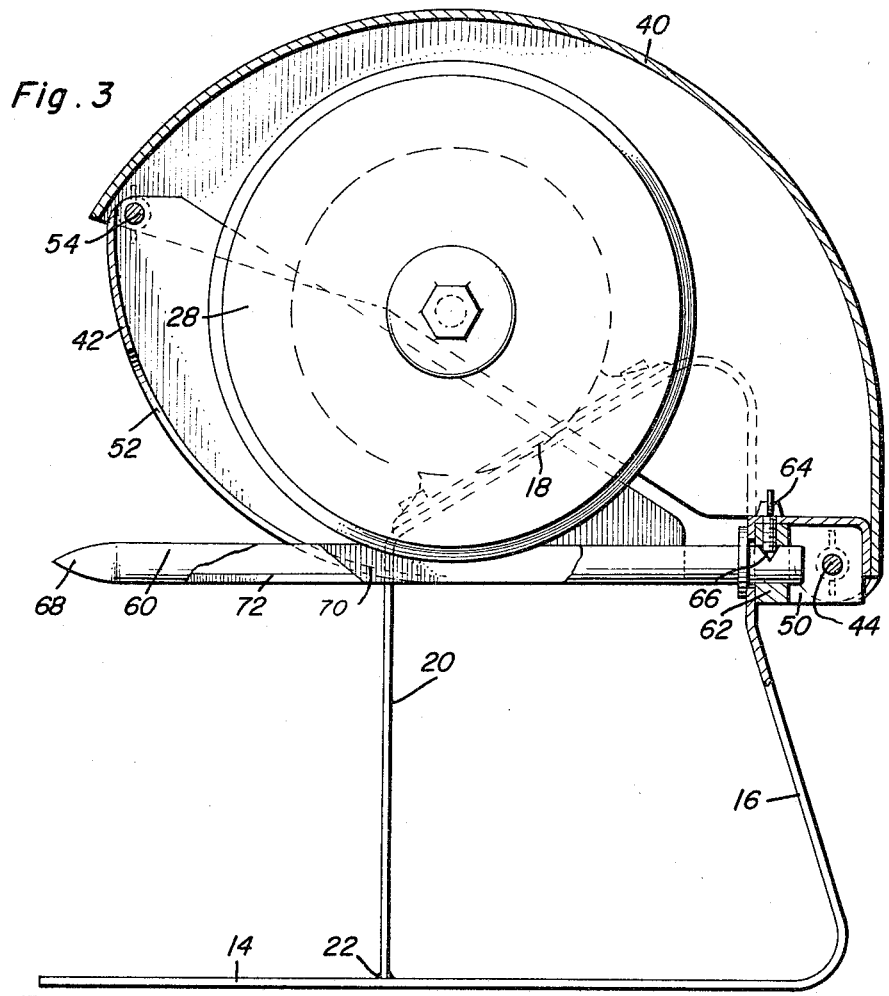
FIGURE 3 is a vertical transverse section through the machine taken substantially upon the plane indicated by section line 3—3 of FIGURE 2.

Referring now to the accompanying drawings, the numeral 10 designates generally a preferred embodiment of a poultry cutter or trimmer in accordance with the principles of this invention. The apparatus disclosed includes a base 12 which may conveniently comprise a single sheet or casting of metallic construction including a flat plate 14 together with an upstanding rear wall 16. The upper end of the rear wall as shown in dotted lines in FIGURE 3 is provided with a downwardly and forwardly inclined top wall or portion 18 whose forward end terminates in a vertical depending leg 20 which rests upon and is secured to the base plate 14 as by welding 22. Adjustably mounted upon this top wall 18 is an electric motor 24 which is secured as by fastening bolts 26. The bolts may be received in slots in the wall 18 to permit movement of the motor up and down with respect thereto for the purpose of raising and lowering the rotary knife or cutter blade 28 which is supported and driven by the motor shaft or drive shaft 30.

As shown in FIGURE 2, the blade 28 may be detachably secured to the shaft 30 by means of a sleeve-like hub 32 on the blade which comprises a coupler having an axial bore 34 therein for receiving the shaft 30, into which the hub is secured as by setscrews or the like 36. It will thus be apparent that the power driven rotary knife is disposed for rotation about a horizontal axis which overlies that portion of the base plate 14 which is to one side of the vertical wall 20.

The machine also includes as an important safety feature thereof a safety guard consisting of a hood-like relatively stationary section 40 which overlies and encloses the upper portion of the blade and which has pivotally mounted upon its forward portion a relatively movable guard section 42 which further encloses the knife or blade.

Referring now especially to FIGURE 3 it will be observed that the upper guard section 40 is pivotally mounted upon a transversely extending bolt 44 having, as shown in FIGURE 2, wing nuts 46. The bolt is secured in suitable lugs apertured for that purpose and carried by the lower end of the rear portion of the upper guard section 40 and by outwardly projecting ears 50 extending rearwardly from the rear wall 16 of the base. The arrangement is such that normally the wing nuts will retain the guard in its lowered position about its pivotal support 44 which is the position shown in FIGURES 1 and 3 of the drawings. However, when it is desired to elevate the guard as to obtain access to the rotary knife 28 or to remove the guard, the wing nuts may be unscrewed and the pivot pin 44 removed whereupon the guard may in turn be removed. This operation intentionally will require a considerable period of time to effect, as for example about 30 seconds which will give ample time for the rotation of the knife blade 28 to seat after the electric motor has been deenergized.

As will be apparent from inspection in FIGURES 1 and 3, the lower edge of the stationary upper guard section 40 slopes downwardly and rearwardly from the front edge thereof to expose a portion of the lower section of the rotary blade 28, while the major and upper portion of the latter is disposed within the side walls and curved top wall of the guard section 40. In order to more effectively complete the closure of the blade while still permitting the blade to operate as poultry or other articles to be cut and trimmed are passed therebeneath, there is provided a previously mentioned movable lower section 42. The lower section is a cylindrical segment of U-shaped configuration having its parallel side walls which embrace the sides of the blade 28 joined by an arcuately extending peripheral wall provided with a slot 52 which thus bifurcates the wall, this slot serving to straddle and permit the projection of the edge of the rotary knife 28 therethrough as the lower section is pivoted upwardly about its removable pivot bolt and wing nut 54. Normally, the lower section will project downwardly below the rearmost portion of the saw blade as shown in FIGURE 3 but may be elevated thereabove with the blade then projecting through the slot 52 as a fowl is moved under and against the cutting edge of the blade.

A further very important feature of this invention resides in a removable support and guard bar 60 which is disposed in horizontal position immediately below the rotary blade 28. Referring to FIGURE 3 in particular it will be noted that this bar has its rearward end removably received in a socket 62 carried by the rear wall 16 with a setscrew 64 in the socket engaging a notch 66 in the rearward portion of the support bar to detachably support and retain the bar in operative position. The support bar is preferably of circular cross-section and is of substantially uniform diameter throughout its length, having a smoothly rounded point or nose portion 68 at its forward end to facilitate passage of the bar through poultry. The top surface of the bar is provided with a medially disposed longitudinally extending recess 70 into which the lower portion of the knife blade 28 penetrates so as to insure a complete severing of the poultry or other articles passed along and supported by the support bar as the articles are moved beneath the lower edge of the rotary knife blade.

The lower surface of the support bar is provided with a medially disposed longitudinally extending keyway 72 for the purpose of accommodating various attachments which may be mounted upon the bar as set forth hereinafter.

Figure 10:
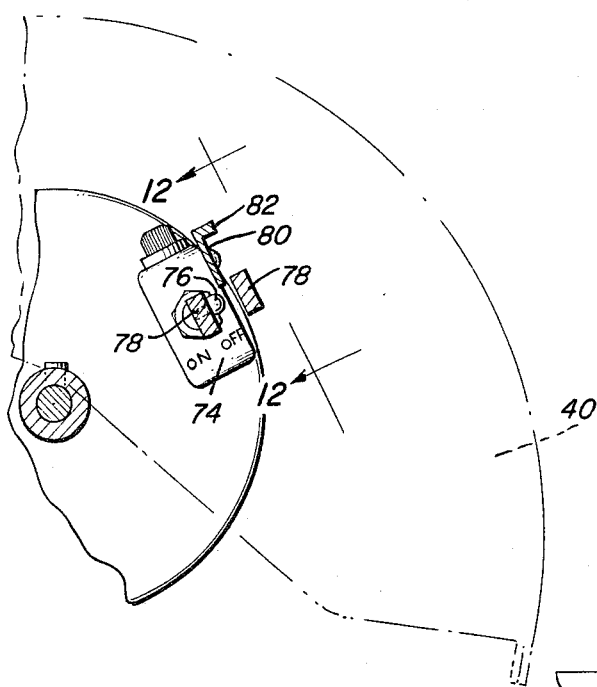
FIGURE 10 is a fragmentary detail view partly diagrammatic and in vertical transverse section, taken substantially upon a plane indicated by section line 10—10 of FIGURE 2 and showing the safety switch operator of the blade guard in switch cut-off position.
Figure 12:
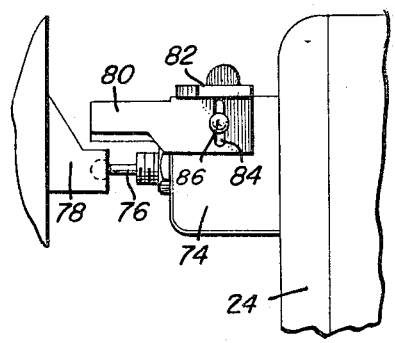
FIGURE 12 is a detailed view, taken in vertical longitudinal section substantially upon the plane indicated by section line 12—12 of FIGURE 10 and showing the safety switch together with a manual lock means therefor.
Figure 13:
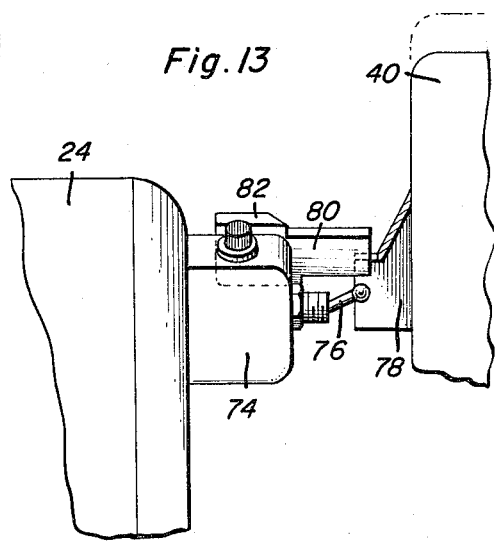
FIGURE 13 is a detailed view similar to FIGURE 12 but taken from the reverse side thereof.
Figure 11:
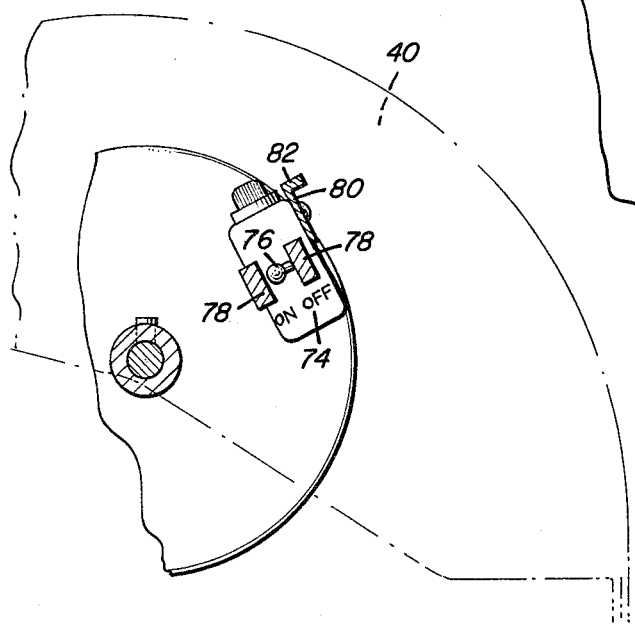
FIGURE 11 is a view similar to FIGURE 10 but showing the position of the parts in the switch on position.

A further important safety feature of this invention resides in an automatic control of a switch in the circuit of the electric motor 24 for automatically deenergizing this circuit when the upper guard section 40 is moved upwardly from its lowered position. For this purpose switch housing 74 is mounted upon the end wall of the motor 24 and is provided with an outwardly projecting actuating lever arm 76. Secured to and projecting laterally from the side wall of the upper housing section 40 are a pair of switch actuating cam plates each indicated by the numeral 78. These plates are spaced from each other is will be apparent in FIGURES 10 and 11 such that they will receive the switch arm 76 therebetween. The cam plates 78 are so arranged that when the guard section 40 is in its fully lowered position as shown in full lines in FIGURES 1 and 3, the two cam plates will move the switch arm to the switch on position shown in FIGURE 11. However, upon initial upward tilting of the cover section 40, the plate 78 will move the switch arm to the off position as shown in FIGURE 10 thereby preventing operation of the motor and of the rotary knife until the cover is in its lowered position to fully enclose the rotary knife blade.

A manual lock means is also provided to further retain the switch in its off position. This includes, as shown in FIGURES 2, 10–13, a slide plate 80 in the form of a blade having a perpendicularly laterally projecting finger-grip flange 82 upon its upper edge. The plate 80 is slotted as at 84, see FIGURE 12, and a fastener 86 extends through this slot and into the switch housing 74 to mount the plate for sliding movement upon the switch housing. This plate is disposable between the pair of plates 78 when the latter are in the switch off position of FIGURE 10, at which time the safety lock 80 may be pushed downwardly into a position between the switch actuating arm 76 and one of plates 78 and thereby further prevent movement of and release of the switch arm so as to avoid any possibility of the switch accidentally moved to the on position.

Figure 7:
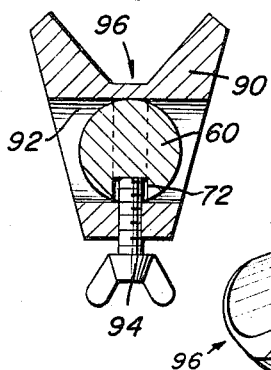
FIGURE 7 is a view in vertical transverse section taken substantially upon a plane indicated by section line 7—7 of FIGURE 6.
Figure 6:
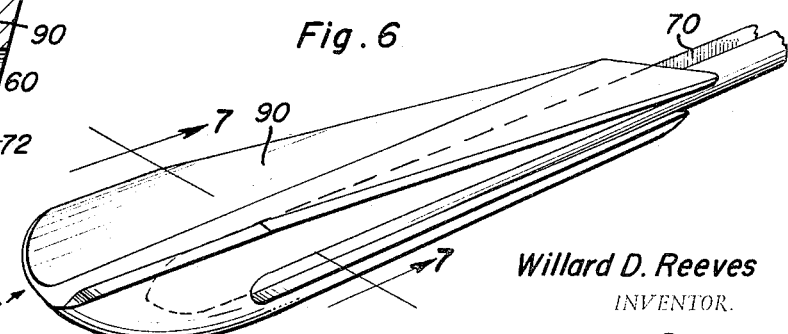
FIGURE 6 is a perspective view of a portion of the support bar and showing an attachment mounted thereon adapted to support the backbone of a fowl when the breast is to be split by the cutter blade.

A number of attachments are provided for interchangeable use with the support bar 60. Shown in FIGURES 6 and 7 is an attachment especially useful for supporting the backbone of a fowl when it is desired to split the breast thereof by the rotary blade 28. This attachment consists of an elongated body 90 having an elongated bore 92 therein for sliding engagement upon the support bar 60. A wing bolt 94 is threadedly engaged through the bottom wall of the body 90 extending upwardly through the bore 92 to be extended through the keyway 72 and prevent rotation of the body upon the support bar while enabling it to be longitudinally slid or adjusted therealong. The top surface of the body 90 of the attachment is provided with a trough of generally V-shaped configuration as shown at 96 into which the backbone of the fowl may be rested.

When this attachment is used, it is evident that the attachment itself will provide a holding means slidably adjustable along the support bar which provides a cradle holding the fowl upon its back in the proper position for passage thereof beneath the rotary knife blade. In this instance, it is evident that the knife blade will have to be raised higher than the position shown in FIGURE 3 in order to accommodate the carriage or body 90 therebeneath. This can be readily effected by adjusting the motor and knife upon the top wall in the manner previously mentioned.

A further attachment which may be used in accordance with the invention is a horizontal platform 100 as shown in FIGURES 8 and 9. This platform preferably comprises a flat plate or body which is provided with a channel-shaped bracket 102 upon its under surface of a sufficient size to slidably embrace the support bar 60 therein. A wing nut 104 is threadedly engaged in the bottom of the channel-shaped bracket 102 and into the previously mentioned keyway 72 of the support bar to provide means for adjustably positioning the platform upon the support bar. The platform may be used for various purposes such as slicing vegetables or other material.

A still further attachment which may be used with the invention is shown in FIGURES 4 and 5 and consists of a sharpener indicated generally by the numeral 110. The attachment 110 comprises a base or bracket 112 having upstanding substantially parallel support arms 114 which have inwardly directing axles 116 carrying sharpening or grinding elements 118 in the form of disks. The latter are spring urged as by compression springs 120 surrounding the axle 116 in a position towards each other and for embracingly engaging the edge of the rotary knife blade 28 as shown in FIGURE 4. Preferably the axles are at slight angle to each other and the sharpening elements 118 are beveled or are provided with grinding surfaces so inclined as to impart the proper bevel to the knife edge of the rotary blade 28.

The body is provided with a longitudinally extending bore 122 therethrough having a bushing or sleeve 124 therein which slidably receives and is mounted upon the support bar 60. The bushing or sleeve 124 projects beyond the end of the bracket 112 and is provided with a knurled handgrip portion 126 by means of which it may be grasped to thereby move the device toward and from the rotary blade. A retaining or guide pin 128 extending through the bushing 124 and into the previously mentioned keyway 72 on the bottom surface of the support bar to prevent turning of the sharpening attachment upon the support bar as the sharpener is moved axially along the bar into operative contact with the edges of the knife blade.

The arrangement is such that by pushing the sharpener 110 against the knife blade while the latter is rotating, the rotation of the knife blade will cause the edges to pass through the grinding or sharpening disk 118 and thus be sharpened thereby, the disk rotating under the frictional contact with the rotary blade thereby promoting even wearing of the sharpener elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A poultry cutter comprising a base, a power driven rotary knife mounted on said base for rotation about a horizontal axis, a support and guide bar mounted upon said base and disposed horizontally and in the vertical plane of said knife and closely adjacent therebeneath, said bar being shaped and adapted to impale a fowl when passing the latter beneath said knife, said bar having a longitudinal recess upon its top surface providing clearance for and receiving said rotary knife whereby poultry supported on said bar may be slid therealong and guided beneath said knife for trimming, said base including an upwardly extending vertically disposed portion, a safety guard enclosing said knife, said guard comprising first and second sections, said first guard section begin removably secured to said upwardly extending portion of said base and relatively stationary with respect thereto during operation of the device and enclosing said blade except on its approach side, said second guard section being pivotally and removably secured to said first guard section and adapted under the influence of gravity to approach the support bar so as to completely cover the knife, said movable section being bifurcated for straddling said blade upon upward swinging movement of the movable section under the influence of poultry being slid along said support bar into the path of said knife.

2. The combination of claim 1 including a control member for said controlling rotation of said rotary blade and movable selectively to on and off positions, said stationary guard section being mounted for upward tilting movement to selectively enclose and expose said blade, an actuator on said stationary guard section operatively engaging said control member and moving it to on and off positions respectively when said stationary guard member is moved to blade enclosing and blade exposing positions.

3. The combination of claim 1 including an electric motor drivingly connected to said blade and a switch controlling an electric circuit of said motor, said switch having a control member movable between off and on positions, an actuator on said guard operatively associated with said switch and effective for positioning said control member in off and on positions respectively when said guard is in raised and lowered positions.

4. A poultry cutter comprising a base, a power driven rotary knife mounted on said base for rotation about a horizontal axis, a support and guide bar mounted upon said base and disposed horizontally and in the vertical plane of said knife and closely adjacent therebeneath, said bar being shaped and adapted to impale a fowl when passing the latter beneath said knife, said bar having a longitudinal recess upon its top surface providing clearance for and recieving said rotary knife whereby poultry supported on said bar may be slid therealong and guided beneath said knife for trimming, a safety guard enclosing said knife, said guard comprising a stationary section mounted on said base and enclosing said blade except on its approach side and a movable section enclosing the approach side of said blade, said movable section being pivoted to said stationary section at the approach end of each and extending rearwardly and downwardly for upward swinging movement about a horizontal transverse axis upon passage of an object along said support bar beneath said blade, said movable section being bifurcated for straddling said blade upon upward swinging movement of the latter, a control member for controlling rotation of said rotary blade and movable selectively to on and off positions, said stationary guard section being mounted for upward tilting movement to selectively enclose and expose said blade, an actuator on said stationary guard section operatively engaging said control member and moving it to on and off positions respectively when said stationary guard member is moved to blade enclosing and blade exposing positions, a manually operable lock mounted for movement between said control member and actuator and blocking movement of said control member.

5. A poultry cutter comprising a base, a power driven rotary knife mounted on said base for rotation about a horizontal axis, a support and guide bar mounted upon said base and disposed horizontally and in the vertical plane of said knife and closely adjacent therebeneath, said bar being shaped and adapted to impale a fowl when passing the latter beneath said knife, said bar having a longitudinal recess upon its top surface providing clearance for and receiving said rotary knife whereby poultry supported on said bar may be slid therealong and guided beneath said knife for trimming, a safety guard enclosing said knife, means mounting said guard for swinging movement between a lowered position enclosing said knife and a lifted position exposing said blade, an electric motor drivingly connected to said blade and a switch controlling an electric circuit of said motor, said switch having a control member movable between off and on positions, an actuator on said guard operatively associated with said switch and effective for positioning said control member in off and on positions respectively, when said guard is in raised and lowered positions, said actuator comprising a pair of cam plates carried by said guard and embracing said control member therebetween for moving the latter upon movement of said guard.

References Cited by the Examiner

UNITED STATES PATENTS

| | | | |
|---|---|---|---|
| 2,079,891 | 5/1937 | Wood | 146—102 |
| 2,237,203 | 4/1941 | Swanson | 17—11 |
| 2,438,184 | 3/1948 | Pflister | 192—135 X |
| 2,486,797 | 11/1949 | Meyer | 146—102 |
| 2,766,477 | 10/1956 | Dahlberg | 17—11 |
| 2,802,235 | 8/1957 | Brown | 192—135 X |
| 2,926,709 | 3/1960 | Kaley | 143—159 |
| 2,941,238 | 6/1960 | Reeves | 17—11 |
| 2,957,198 | 10/1960 | Cianciolo et al. | 17—11 |

FOREIGN PATENTS 934,364   10/1950   Germany.

SAMUEL KOREN, *Primary Examiner.*

LUCIE H. LAUDENSLAGER, *Examiner.*